Dec. 5, 1944.  J. O. PEDERSEN  2,364,241
STOP DEVICE FOR LATHES
Filed May 13, 1941  2 Sheets-Sheet 1
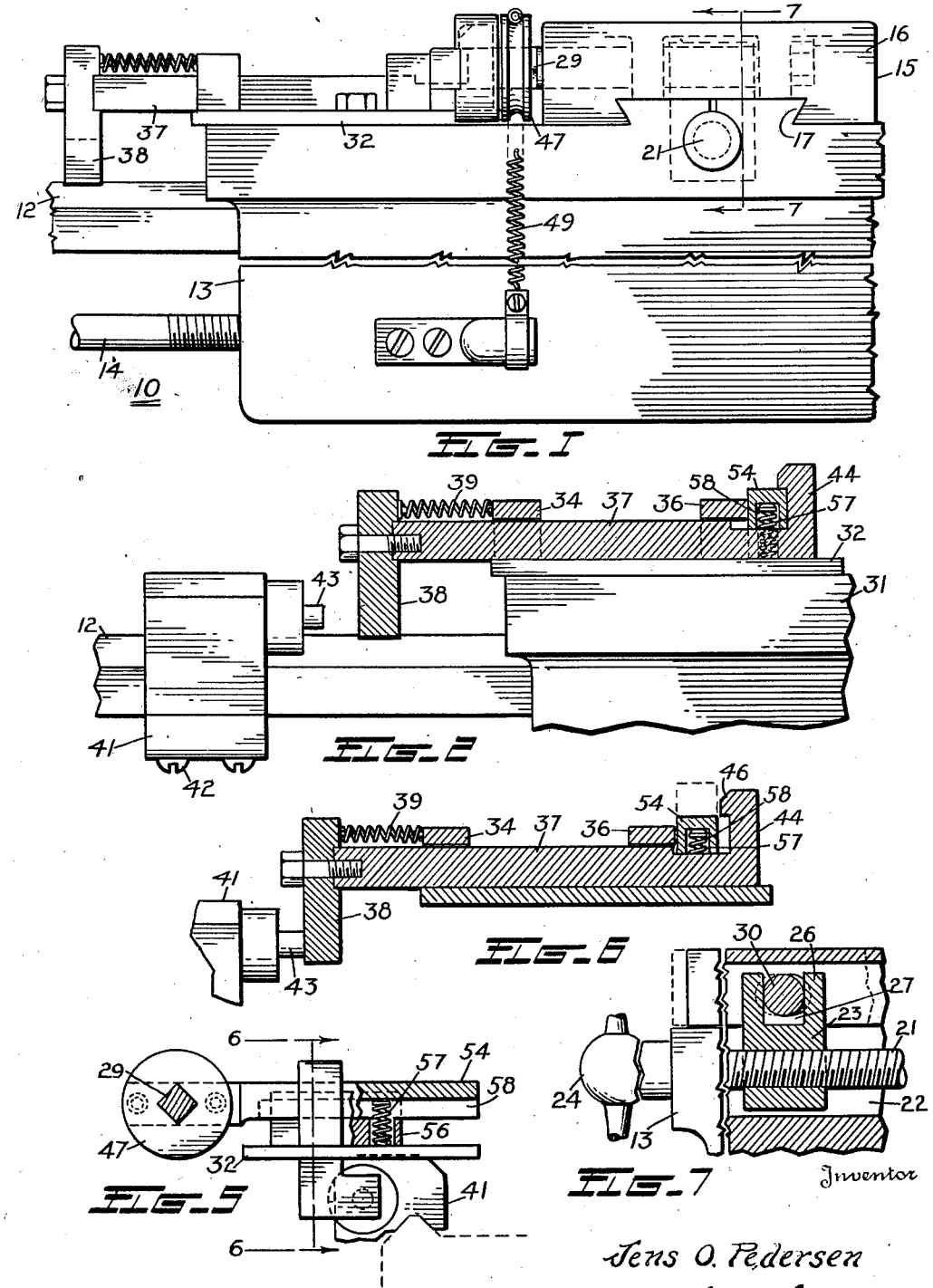
Inventor
Jens O. Pedersen
By
Richmond S. Hayes
Attorney Dec. 5, 1944.  J. O. PEDERSEN  2,364,241
STOP DEVICE FOR LATHES
Filed May 13, 1941  2 Sheets-Sheet 2

Inventor
Jens O. Pedersen
By
Richmond S. Hayes
Attorney

Patented Dec. 5, 1944

2,364,241

UNITED STATES PATENT OFFICE 2,364,241

STOP DEVICE FOR LATHES

Jens O. Pedersen, Erie, Pa., assignor to Swanson Tool and Machine Corporation, Erie, Pa., a corporation of Pennsylvania Application May 13, 1941, Serial No. 393,216

4 Claims. (Cl. 82—5)

This invention relates to an improvement in cross-feed devices for lathes and more particularly to a structure for the rapid withdrawal of a tool from a work-piece.

The invention is more specifically directed to a backout structure for use with a cross-feed tool support by which a tool may be successively retracted from a work-piece at exactly the same point. In its present form the invention finds particular application to single point thread cutting work wherein a cutting tool must be successively applied to a blank to obtain a cut of desired depth and withdrawn each time at exactly the same point in order that the end of the cut may terminate in accordance with any given measurement requirement.

In single point thread cutting it has been the practice of operators to attempt to successively withdraw the cutting tool at the same point at the end of a cut. Inasmuch as the work-piece is rotating, an operator must, upon nearing the end of the cut, slow down or stop rotation entirely and then rotate the piece by hand until the exact end of the cut is reached, at which point the tool is withdrawn by the conventional feed mechanism. This method not only slows down the operation of thread cutting but frequently leads to inaccuracies. To improve accuracy in single point thread cutting there has been devised a lever operated structure for use with compound tool rests that could be quickly actuated independently of the conventional cross-feed mechanism of the tool rest for the purpose of withdrawing a tool. Little is gained, however, by this, inasmuch as it still is necessary for the operator to guess how close the cutting tool is to the end of the cut before throwing the lever to disengage the tool. It would, therefore, seem that no device for this purpose makes possible the accurate cutting of threads so long as the operator must attempt to repeatedly withdraw the tool at exactly the same point at the end of each cut.

It is an object of the present invention to overcome the above mentioned objections by providing an automatically operable device for quickly withdrawing a tool at a desired point from a work-piece. Additionally, it is the purpose of the invention to provide automatically operable means for repeatedly withdrawing a cutting tool from a work-piece at exactly the same point. Furthermore, the structure of the present invention is such that it may readily constitute an attachment for lathes now in use or may be incorporated into and be a permanent part of the structure of a single or compound cross-feed tool rest. It is believed the invention finds additional merit by reason of its extremely simple construction, together with ready installation and ease and convenience of use.

Other advantages of the invention may be more fully understood and appreciated from a consideration of the following specification taken in conjunction with the accompanying drawings; and in which Figure 1 is a fragmentary front elevational view of a lathe embodying one form of the invention;

Figure 2 is in part a vertical sectional view, being taken substantially on the line 2—2 of Figure 4;

Figure 5 is a fragmentary view partly in section, being taken substantially as indicated at 5—5 of Figure 4;

Figure 6 is a vertical sectional view taken substantially on the line 6—6 of Figure 5, showing another position of the movable parts shown in Figure 2; and Figure 7 is a fragmentary vertical sectional view taken substantially on the line 7—7 of Figure 1.

Figure 3:
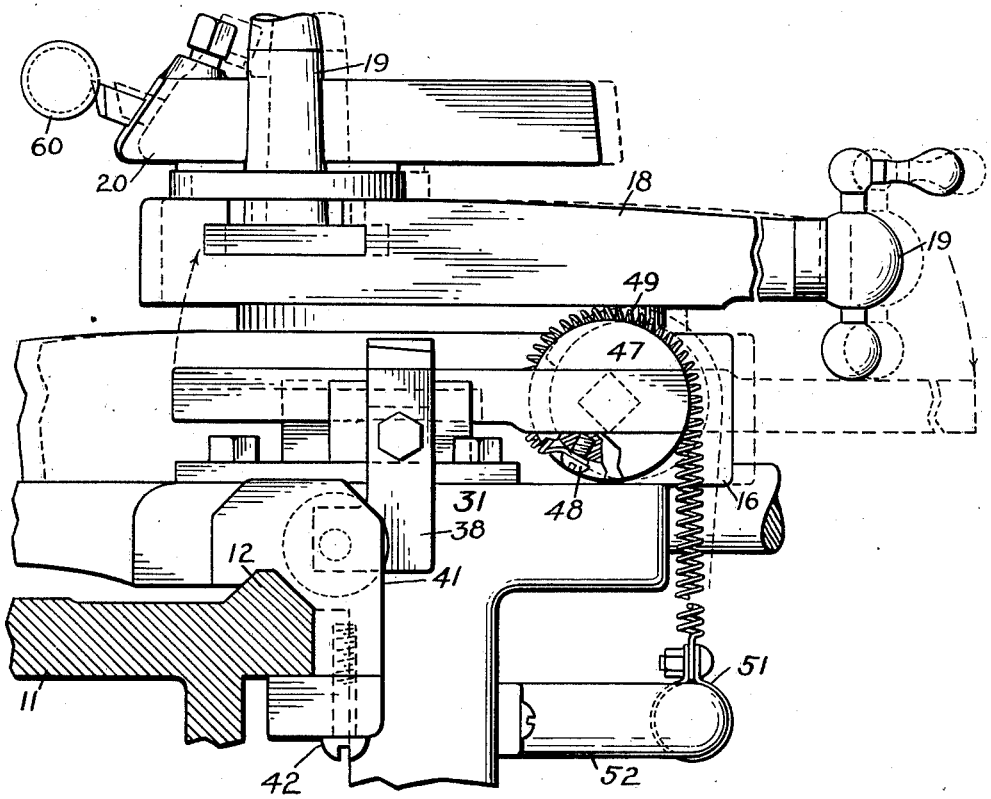
Figure 3 is a transverse vertical sectional view showing a carriage mounting, compound tool rest, and the inventive structure in position of use.

Reference is now had more particularly to the drawings wherein the numeral 10 is employed to generally designate a lathe in which is embodied one form of the invention. The lathe comprises a bed 11 on which are located tracks or ways 12. Mounted on tracks 12 is a carriage 13. The carriage is movable along the tracks by means of a conventional screw feed 14 and in its present form includes a compound tool rest 15. The rest consists of a lower slide 16 mounted on suitable cross-ways 17 of the carriage, together with an upper slide 18 which carries a conventional tool mount 19 and tool 20. The slide 18 is provided with a conventional screw feed mechanism operable by means of a crank 19.

The slide 16 is also screw fed across the carriage 13. In this structure, however, a screw 21 is mounted in suitable bearings in the carriage 13, the central portion of the screw being within a rectangular groove or slot 22. A block 23 is located in the slot 22 and has threaded engagement with the screw 21. Rotation of a handle 24, fitted to the exposed end of the screw 21, rotates said screw and moves said block lengthwise of the slot 22, that is, transversely of the lathe. The top of the block 23 is formed with upstanding lugs 26 that are spaced to provide a recess 27 extending transversely of the screw 21. The slide 16 is apertured to receive a shaft 28, the squared end 29 of which projects beyond one side edge of the slide. Centrally the shaft is formed with a crank arm 30 that is fitted into the groove 27 of the block 23. From the foregoing it is evident that the slide 16 may be moved transversely of the lathe in one direction or the other by rotation of handle 24, and also that slide 16 is adjustable with respect to the conventional feed to an extent determined by the 180° throw of crank arm 30. Further description of the operation of the structure will more clearly bring out this feature of the invention.

Figure 4:
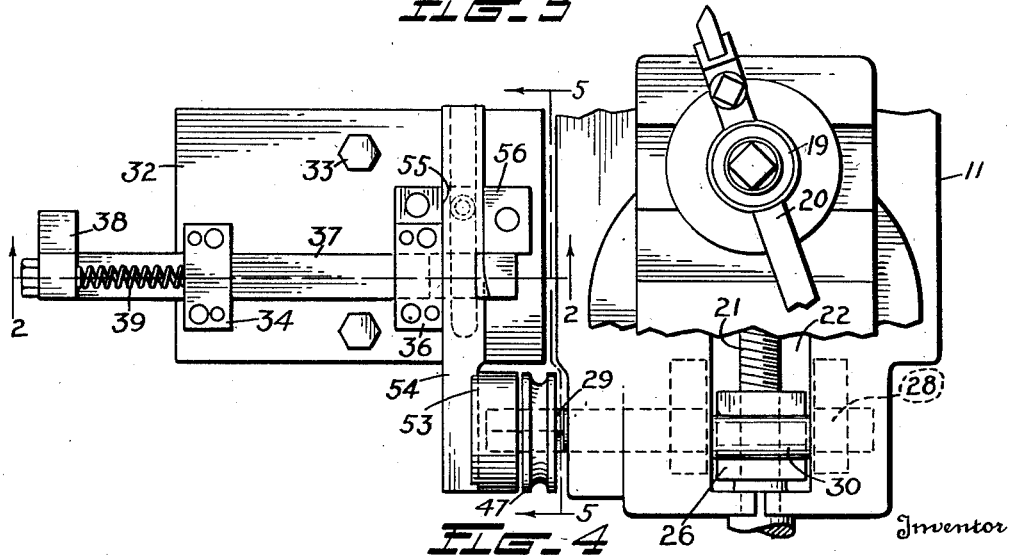
Figure 4 is a fragmentary plan view of the structure of Figure 1, parts being broken away to disclose certain structural details.

On portion 31 of the carriage at one side of the slide 16 is a plate 32, attached in any suitable manner, as by screws 33. Mounted on the plate 32 are guide blocks 34 and 36. These blocks serve as guides for a slidable bar 37, one end of which extends beyond the plate 32, being fitted with a stop finger 38. An expansion spring 39 is positioned between finger 38 and guide 34 and normally urges the bar 37 toward the left, as viewed in Figures 2, 4, and 6 of the drawings. A stop block 41 is designed to fit one of the tracks 12 of the lathe bed, being slidable to any desired position and capable of being clamped or secured thereto in any suitable manner, as by screws 42. This block includes a laterally directed pin 43 that is in the line of travel of a portion of the finger 38. The other end of the bar 37 is formed with an upstanding finger 44 that includes a shoulder 46.

Mounted on the squared end 29 of shaft 28 is a grooved pulley 47. As shown in Figure 3, this pulley is fitted with a screw 48 that secures one end of a spring 49. This spring substantially encircles the pulley, the other end thereof being fastened in any convenient manner, as by a strap 51, to an off-set 52 of the carriage 11. Also mounted on the squared end 29 of the shaft and adjacent pulley 47, is a block 53 from which extends a lever 54. This lever is of sufficient length to extend across the plate 32, being adjacent guide 36, and project into a groove or recess 55 of a block 56. Centrally the block 56 is apertured to receive one end of a spring 57. The other end of this spring projects into a downwardly opening groove 58 in the lever 54. The pulley 47 and block 53 may preferably be made integral, inasmuch as they are both mounted on the squared end 29 of the shaft 28 and, in use, rotate together.

To arrange the structure for quick release of tool 20, lever 54 is rotated 180° from dotted to solid line position (see Figure 3). This movement of the lever rotates pulley 47 and in so doing greatly increases tension of the spring 49. The lever 54 moves bar 37 against tension of spring 39 and is latched against rotation by shoulder 46. It is evident that only a short sliding movement of bar 37 is required to release shoulder 46 from engagement with the lever 54 to permit 180° return movement of said lever.

To more fully understand the advantages of the structure described, the operation of cutting a single point thread in a work-piece 60, indicated in Figure 3 of the drawings, is described. As is common practice, the work-piece 60 is secured at one end in the lathe headstock (not shown). The tool 20 is moved into position at the end of the work-piece by suitable adjustment of the compound rest. The stop block 41 is moved along the track 12 and set at a position such that the end of the stop pin 43 is a slightly less distance from finger 38 than the length of a desired cut. In practically all single point thread cutting operations it is necessary to make several successive cuts, each succeeding cut being deeper than the one previous.

The drive mechanism of the lathe is started, work-piece 60 rotating at desired speed, carriage 13 being moved by screw feed 14 in a manner calculated to produce the required number of threads per inch. As operation continues the carriage and quick release structure move from the position suggested in Figure 1 to that of Figure 2 wherein it is to be noted finger 38 has closely approached stop pin 43. As movement of the carriage continues, finger 38 contacts pin 43 (see Figure 6) and with slight further movement of the carriage, slide bar 37 moves relative to the carriage against tension of spring 39 and releases engagement of shoulder 46 with the upper edge of lever 54. Lever 54, being under tension of spring 49, is immediately caused to rotate 180° from full to dotted line position of Figure 3. Lever 54, being mounted on shaft 28, rotates this shaft, causing crank arm 30 to rotate 180°. Bearing in mind that block 23 moves across the carriage only as screw 21 is rotated by handle 24, this block is now stationary and rotation of the crank arm moves the compound rest 15 a distance equal to the throw of the crank arm and in a direction to withdraw the tool from operative position with respect to the work-piece 60. The carriage 13 is returned to the starting point, and lever 54 once again rotated to advance the compound rest to its previous position and become latched by engagement with shoulder 46 of slide bar 37. The tool being in the position of its first cut, is now slightly advanced preparatory to a second and deeper cut. The mechanism of the lathe is again put in motion and the tool moves along the piece 60 until the finger of the slide bar again contacts the stop 43 and releases lever 54.

It is evident from the foregoing that the slide bar will successively release the lever 54 for rotation and withdrawal of the tool 20 at exactly the same point and in the same time period, and the end of each cut in the piece will therefore exactly correspond to each preceding cut. In this manner the guess-work in single point thread cutting is eliminated, inasmuch as it is only necessary for a lathe operator to successively start the cut on the piece in order that the automatic tool release may function as described.

Although applicant has shown and described only one form of a structure for the automatic duplicate withdrawal of a tool from a work piece in the art of single point thread cutting, it will be apparent to those skilled in the art that this structure may be modified in its application to lathes of different design or other machines requiring automatic tool adjustment, and is so contemplated insofar as such modifications or applications of use are within the spirit and scope of the invention as defined in the claims.

Having thus set forth my invention what I claim as new and for which I desire protection by Letters Patent is:

1. In a single point thread cutting machine having a tool support mounted on a screw fed carriage, and a manually operable cross-feed for said support, a device for automatically withdrawing a tool and support from a work piece comprising a carriage mounted crank, said crank being connected with and adapted to adjust said support independently of the manually operable cross-feed, a spring actuated rotatable lever joined to said crank, latch means engageable with and adapted to secure said lever in operable position, said lever and said latch means being mounted on said carriage, and an adjustable stop member on a fixed portion of said machine, said stop member, when said carriage is moved along said machine, being engaged by said latch means to release said lever whereby to withdraw said tool from a work piece at a point predetermined by the location of said stop member.

2. In a machine having a reciprocal carriage, a tool support mounted on said carriage and a manually operable cross feed for support, a device for the instant withdrawal of a tool from a work piece comprising means mounted on said carriage operably engaged with the cross feed of said support and adapted to move said support from any previous position of adjustment by said cross feed, spring means on said carriage connected with and adapted to actuate the support moving means, latch means on said carriage engageable with and adapted to secure said spring means in operative position, and a stop member on said machine, said stop member being in the line of travel of said carriage mounted latch means and engageable therewith to release said latch means.

3. In a machine having a reciprocal carriage, a tool support mounted on said carriage and a manually operable cross-feed for said support; a carriage mounted device for automatically withdrawing a tool and support from a work piece comprising a crank, means forming part of the cross-feed of said support engaged with said crank, spring means associated with said crank and movable to crank actuable position, and latch means engageable with and adapted to secure said spring means in said crank actuable position, and an adjustable stop member on a portion of said machine engageable by and adapted to release engagement of said latch means with said spring means whereby to move said crank to an actuated position, when said carriage has moved said tool a predetermined distance with respect to the work piece.

4. In a machine having a reciprocal carriage, a tool support mounted on said carriage and a manually operable cross-feed for said support; a device for automatically withdrawing a tool and support from a work piece comprising means on said carriage operably engaged with and adapted to move said support independently of the cross-feed position thereof, spring returned means movable to actuate said support moving means to an operative position, and latch means engageable with and adapted to secure said spring means in tensioned operable position, said spring means and said latch means being mounted on said carriage, and a stop member on a fixed portion of said machine, said stop member being in the line of travel of said carriage mounted latch means and engageable therewith to release said latch means whereby to return the support moving means to an inoperative position.

JENS O. PEDERSEN.